May 28, 1940.　　　　R. R. ROLOSON　　　　2,202,747
VEHICLE BODY
Filed June 29, 1937　　　9 Sheets-Sheet 7
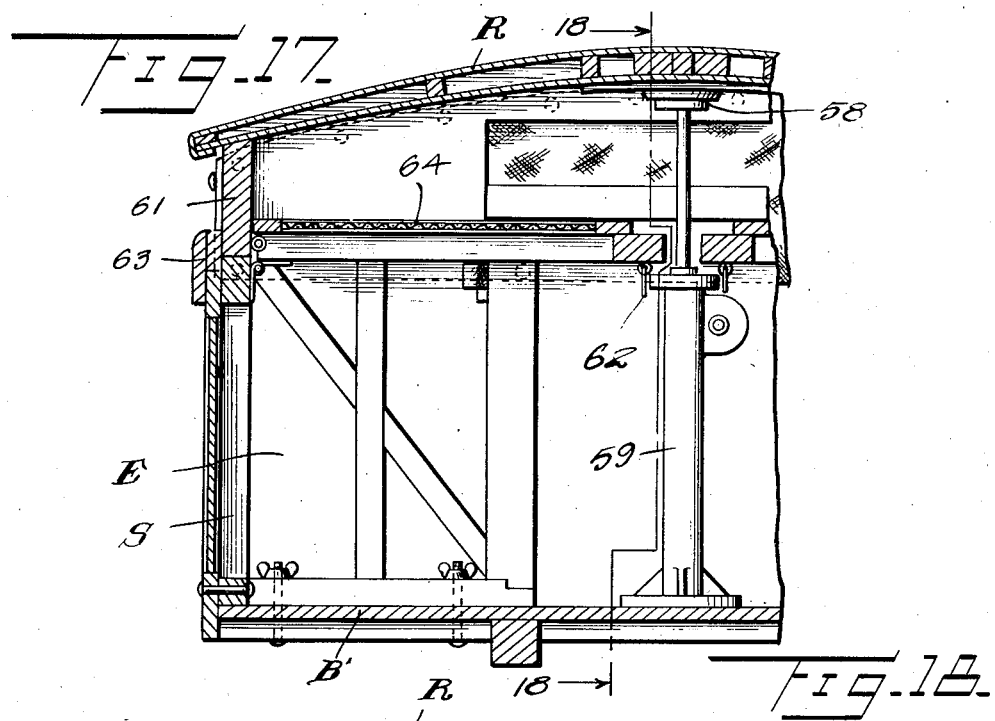
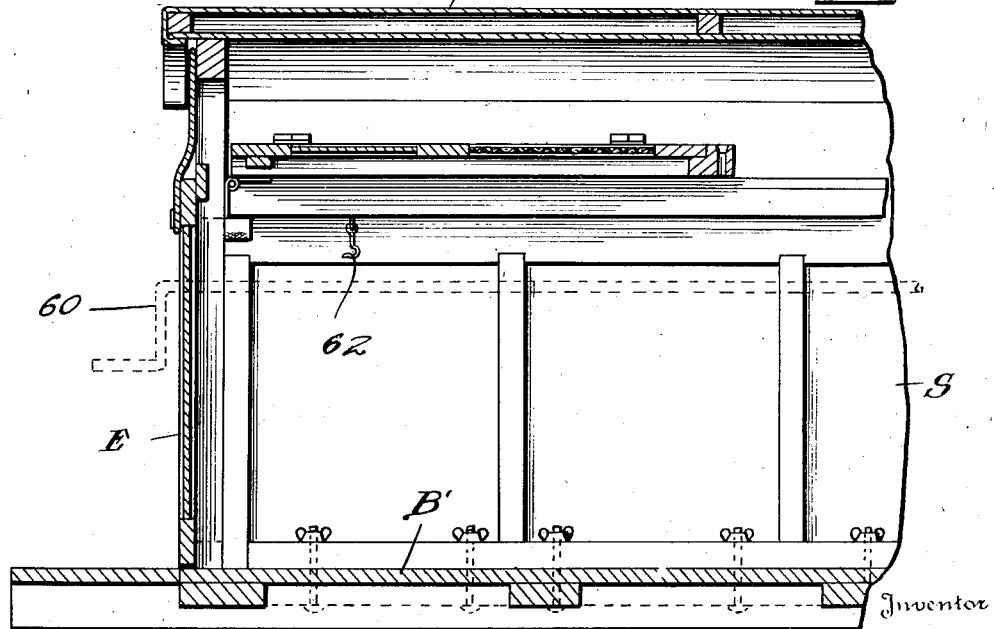
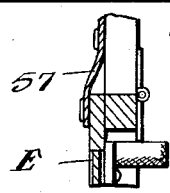
Inventor
Ruby R. Roloson
By Watson E. Coleman
Attorney

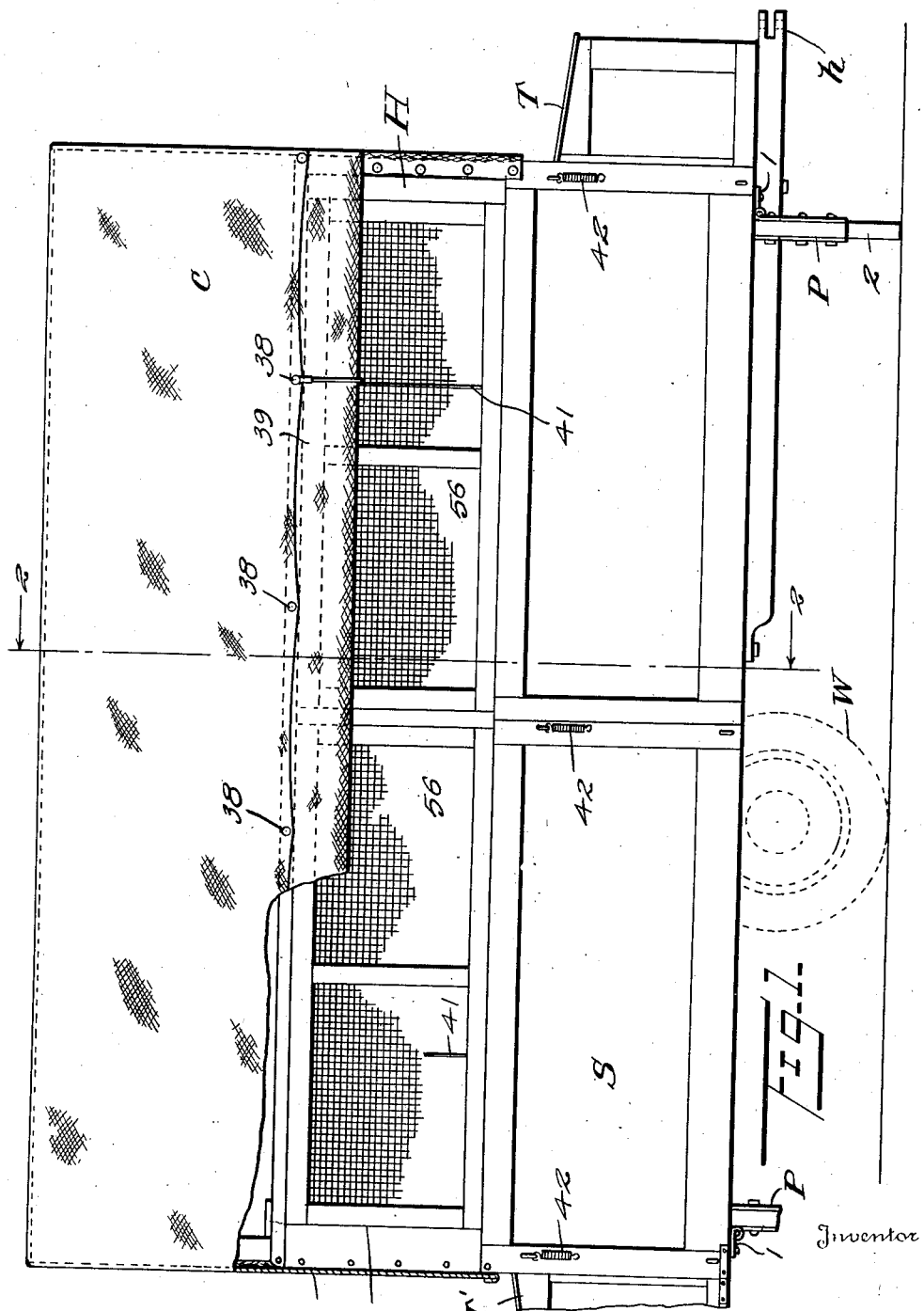

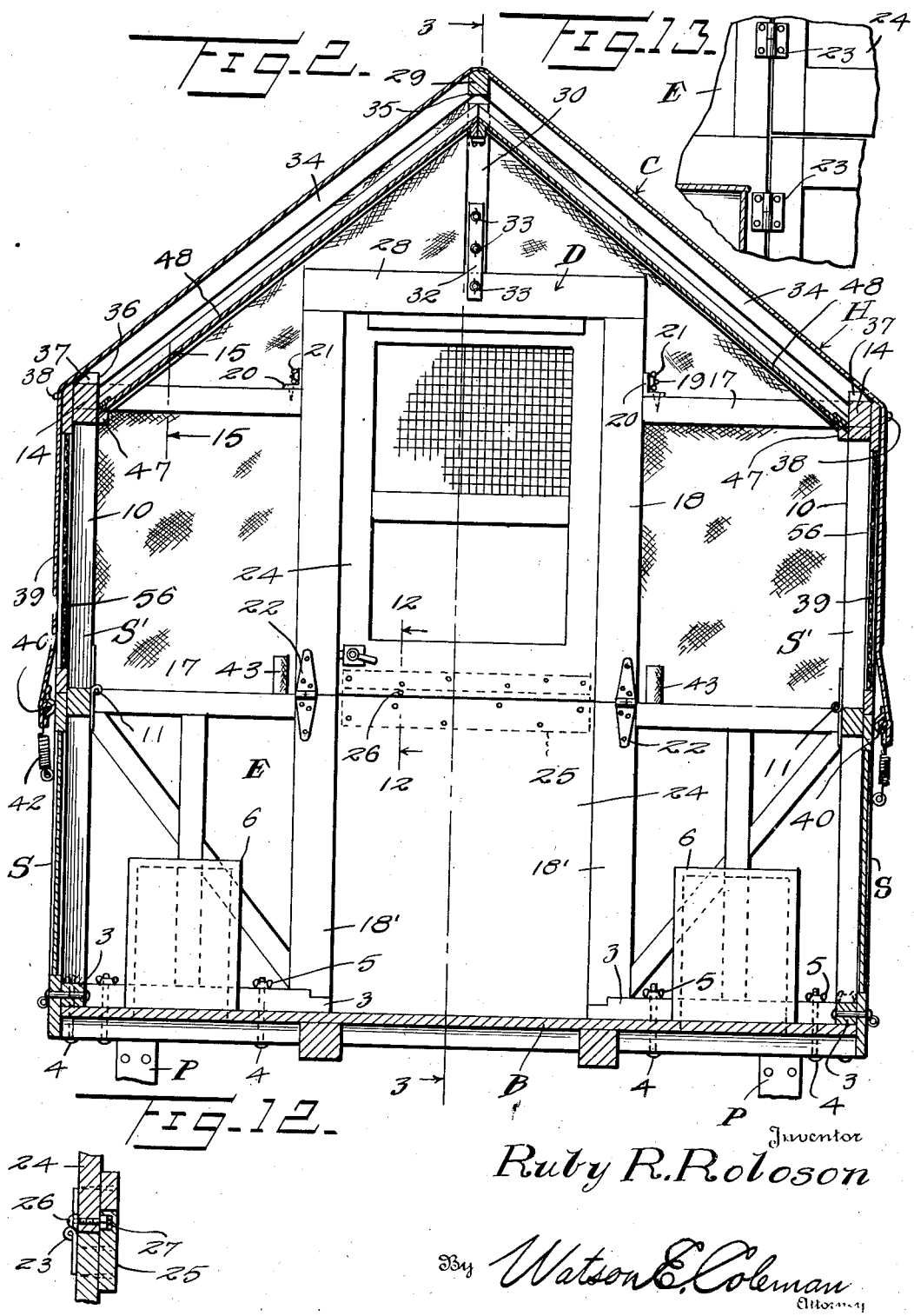

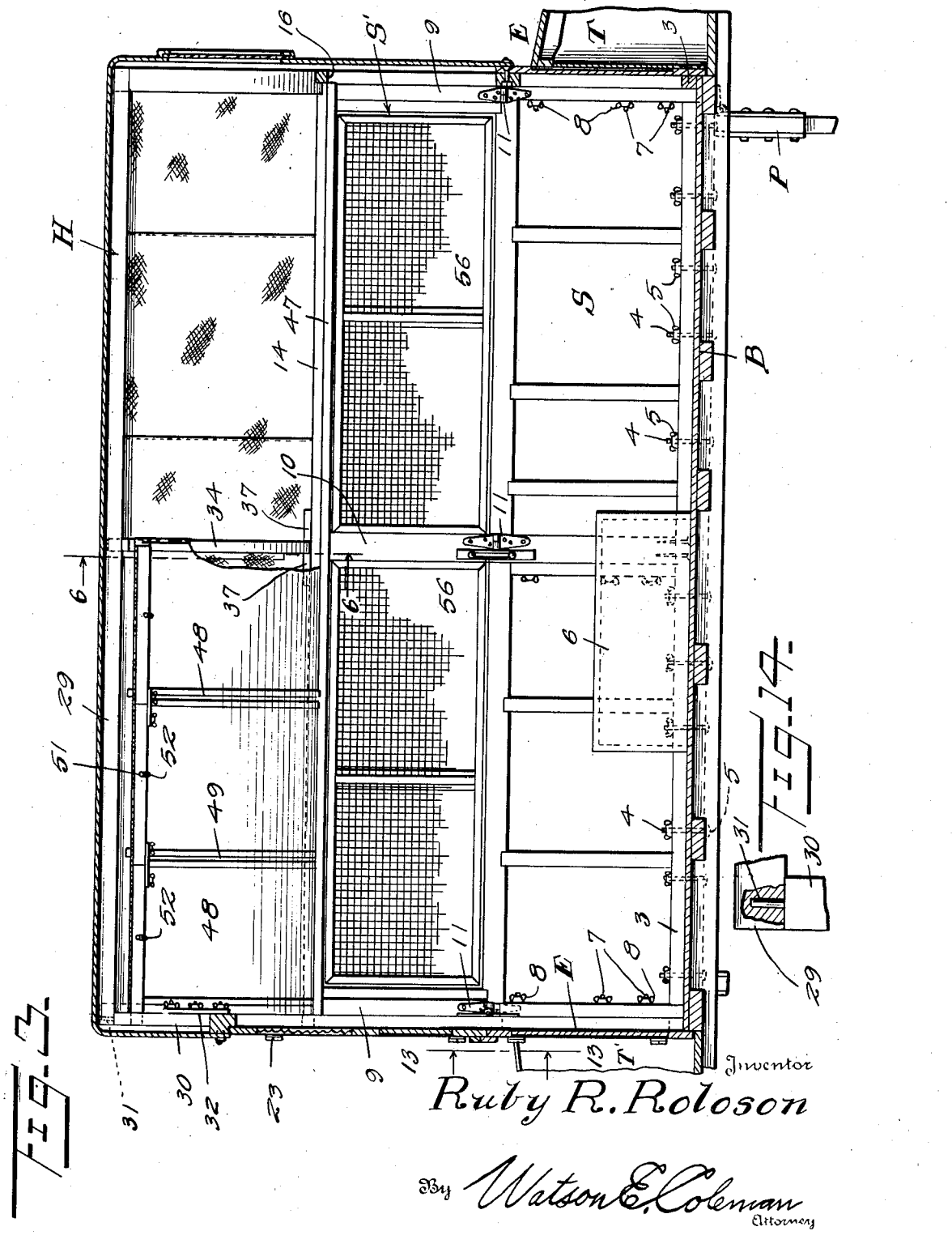

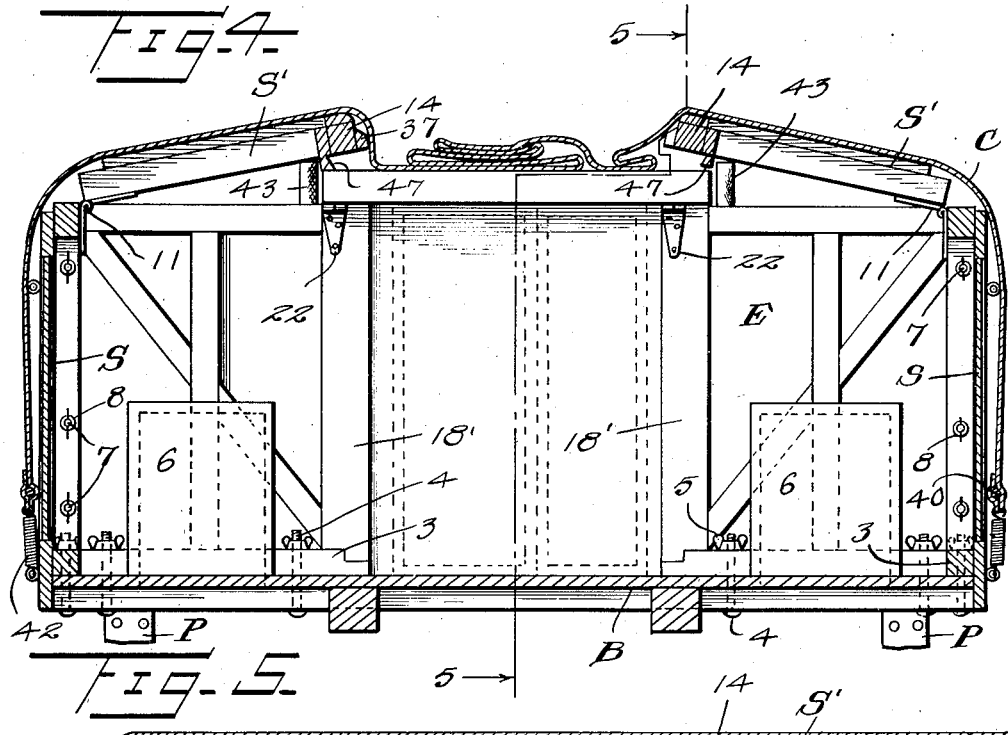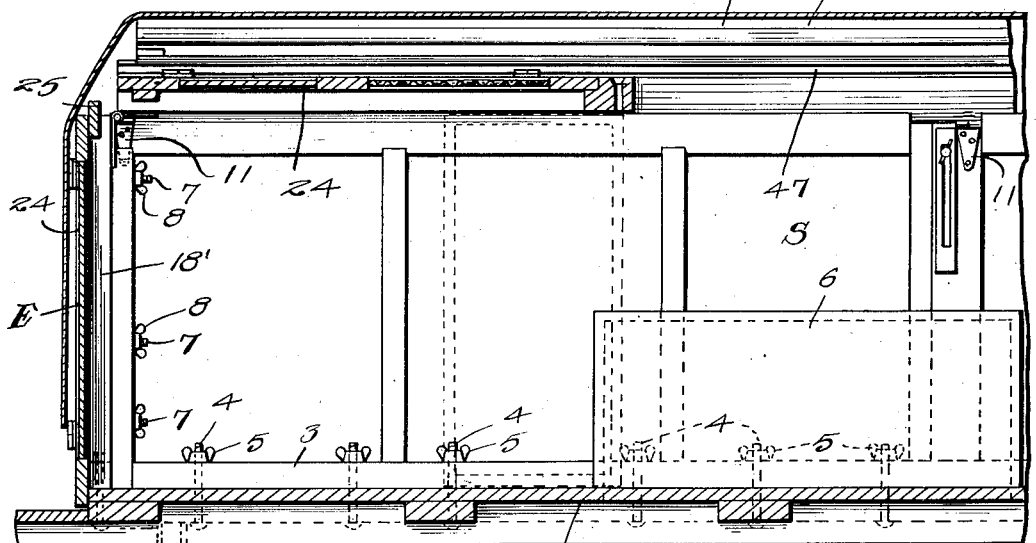

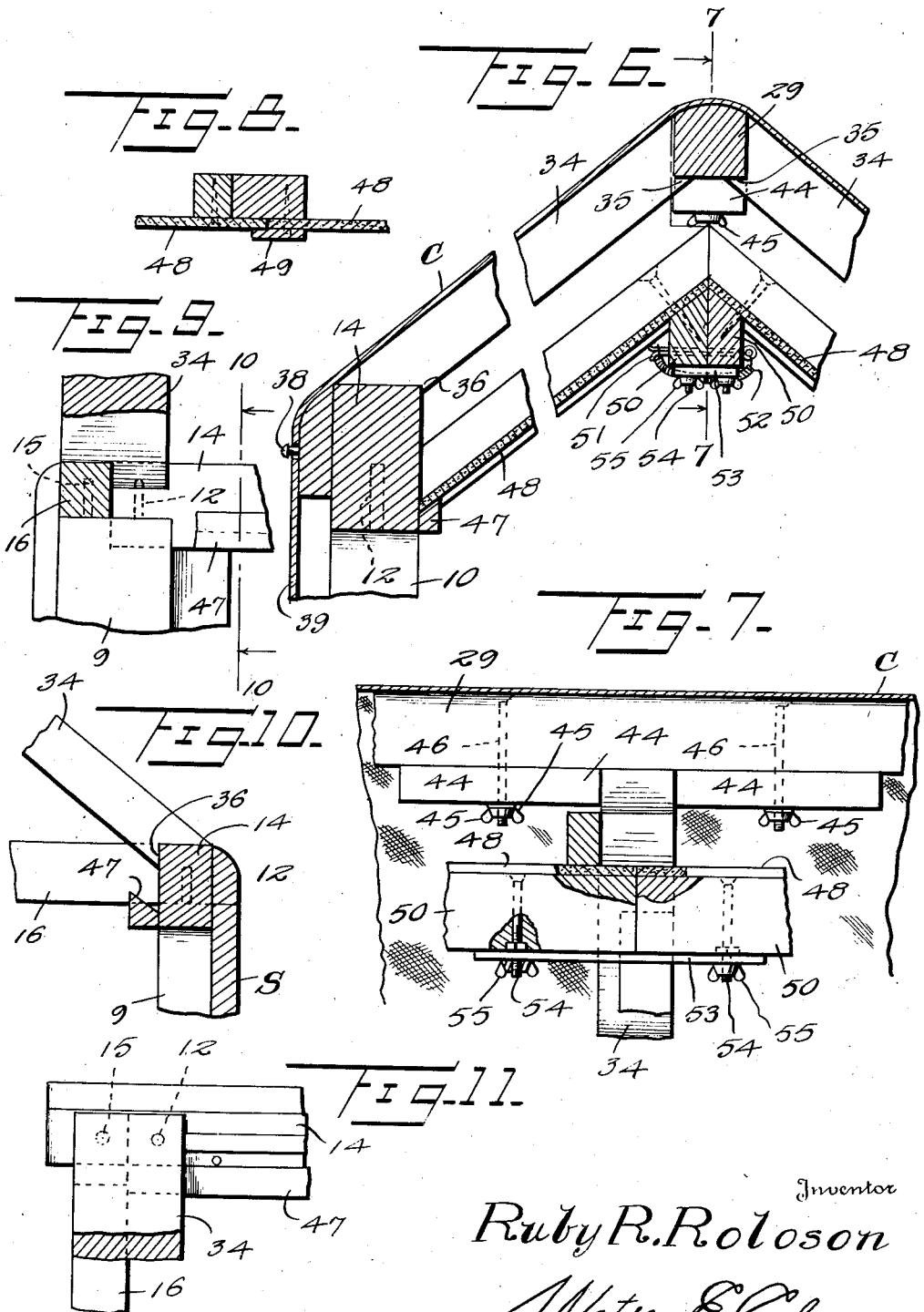

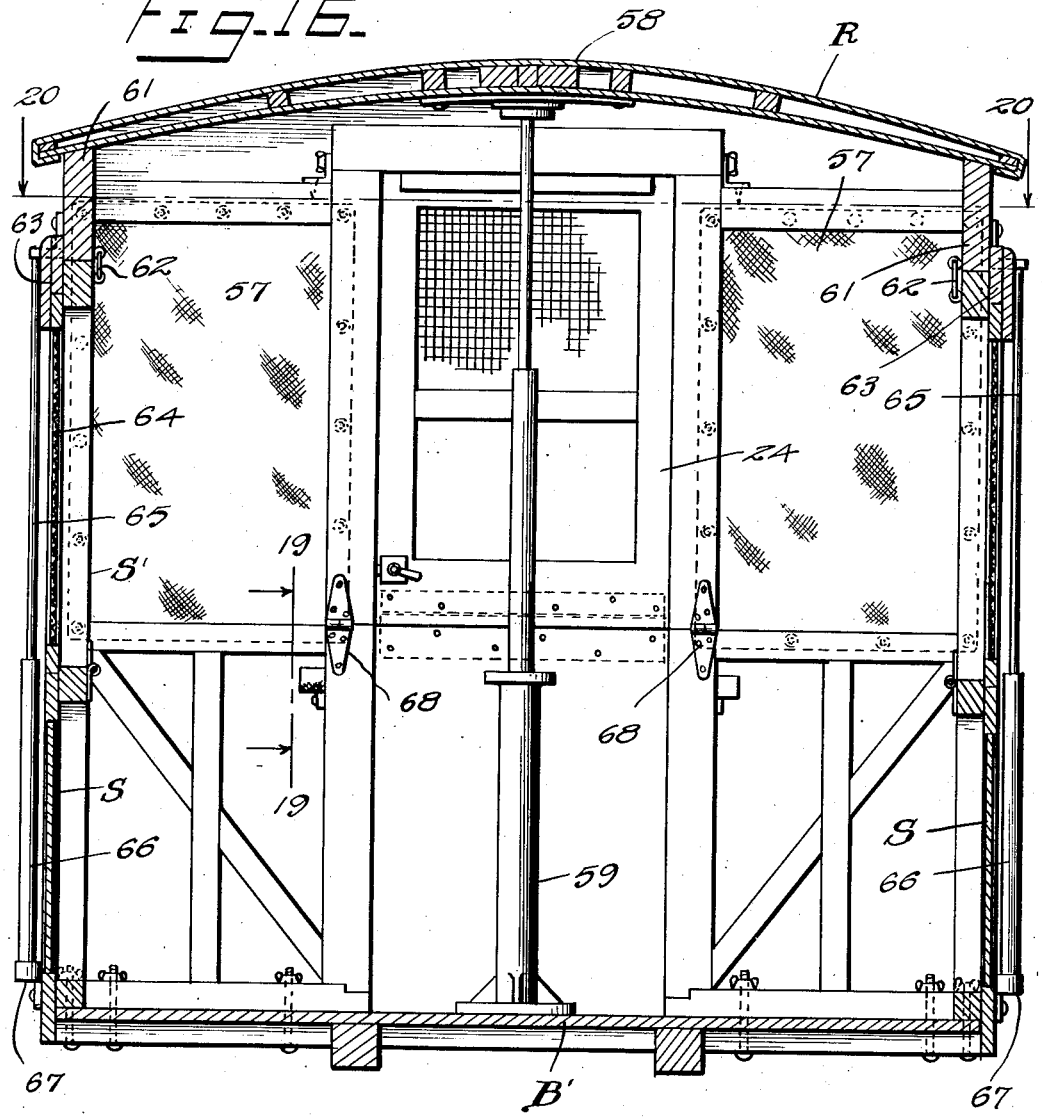

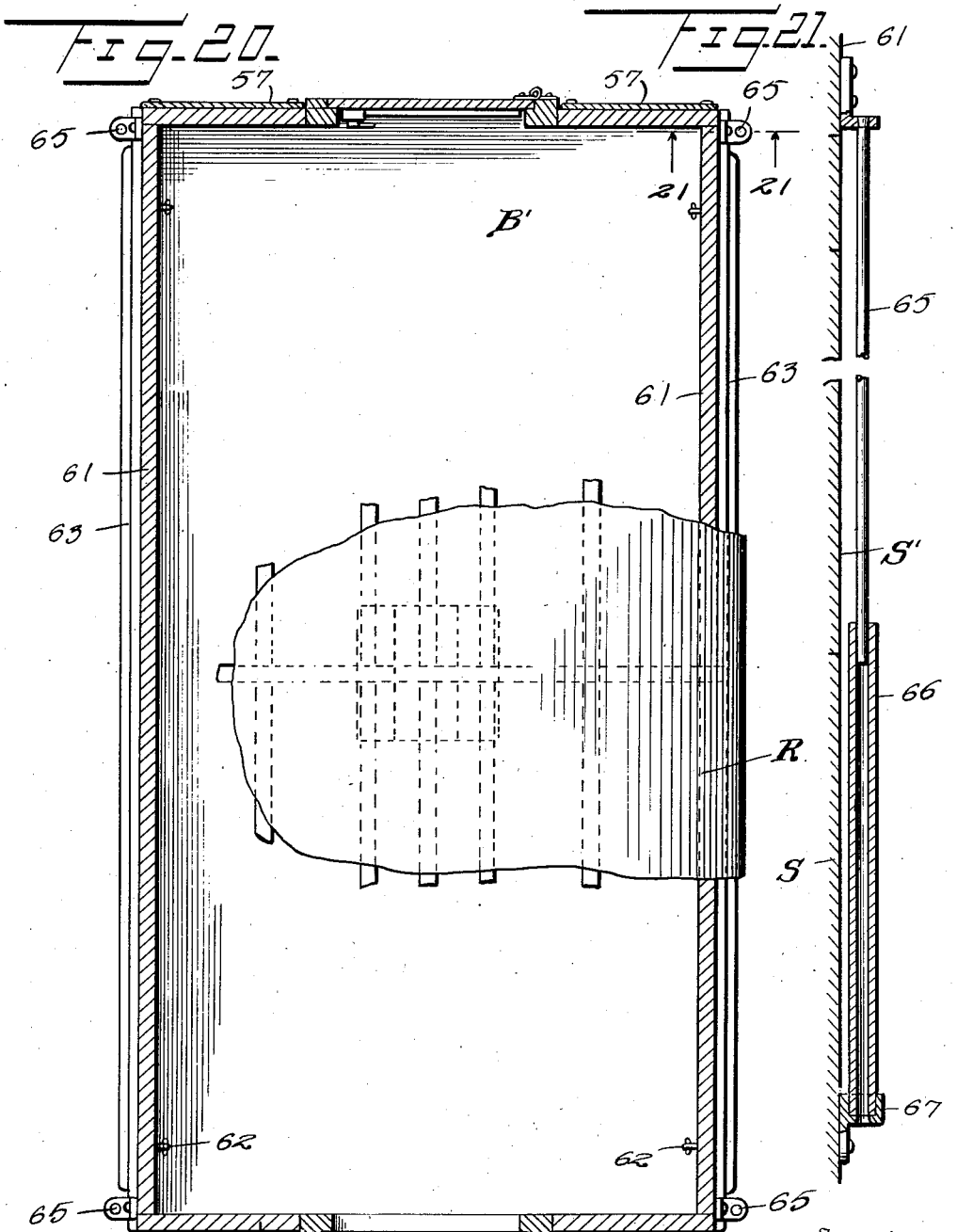

May 28, 1940.  R. R. ROLOSON  2,202,747
VEHICLE BODY
Filed June 29, 1937  9 Sheets-Sheet 9
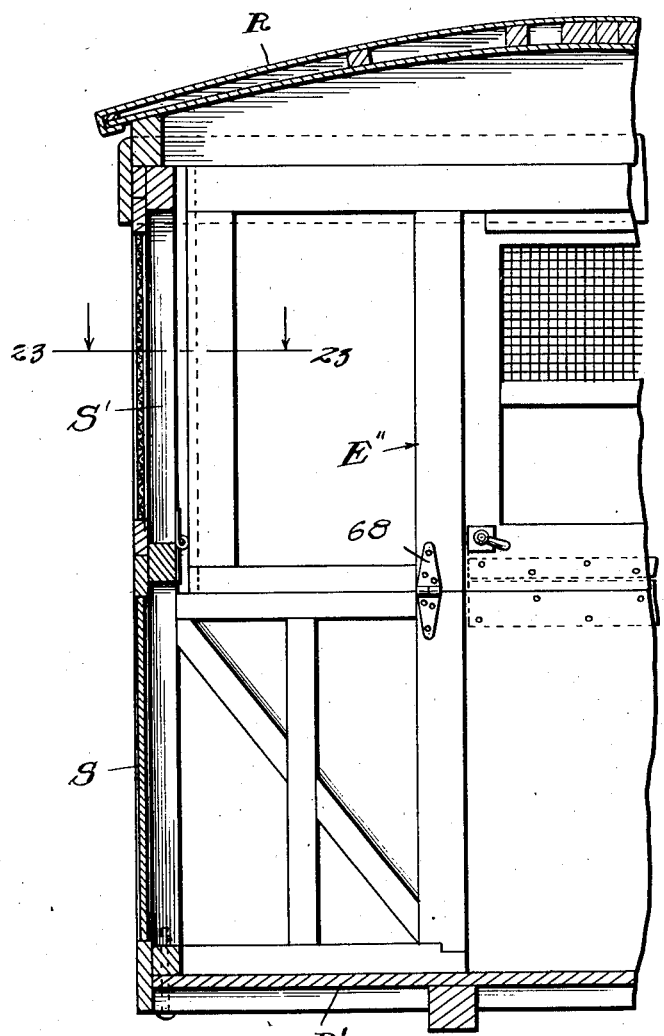
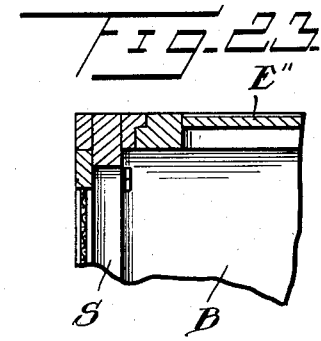
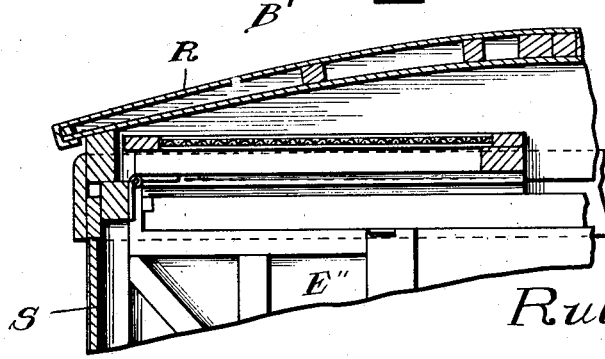
Inventor
Ruby R. Roloson
By Watson E. Coleman
Attorney Patented May 28, 1940

2,202,747

UNITED STATES PATENT OFFICE 2,202,747

VEHICLE BODY

Ruby R. Roloson, Brady, Tex.

Application June 29, 1937, Serial No. 151,006

3 Claims. (Cl. 296—23)

This invention relates to vehicle bodies, and it is primarily an object of the invention to provide what might be termed an all purpose body, that is to say, a body that can be used when desired for camping, or for hauling, and other purposes.

The invention also has for a particular object to provide a vehicle body to be used as a trailer and wherein the body is so constructed and assembled to travel with a minimum of wind resistance.

The invention has for another object to provide a body of this kind comprising a removable housing which can be readily applied or removed from a floor or base structure.

A still further object of the invention is to provide a vehicle body which can be readily compacted when not in use and more particularly during transportation.

A still further object of the invention is to provide a vehicle body including a roof structure which affords heat insulation and wherein side walls of the body may be opened in a manner to increase ventilation.

The invention has for a still further object to provide a vehicle body including a housing structure which can be stored with facility upon a base or floor structure to facilitate transportation, said housing structure with equal facility being extended for occupancy.

It is also an object of the invention to provide a body structure including a housing and wherein the walls of the housing are maintained in secure and rigid assembly when extended or set up for occupancy.

The invention also contemplates the provision of a vehicle body to be used as a trailer and which embodies a structure of light weight thereby avoiding any material increase in fuel costs incident to travel.

Furthermore, it is an object of the invention to provide a vehicle body including a base or floor structure together with a housing mounted upon the base or floor structure whereby the housing as a whole can be removed.

The invention consists in the details of construction and in the combination and arrangement of the several parts of my improved vehicle body whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in side elevation with portions broken away of a vehicle body constructed in accordance with an embodiment of my invention and in assembly for occupancy;

Figure 2 is a vertical transverse sectional view taken substantially on the line 2—2 of Figure 1 looking in the direction of the arrows;

Figure 3 is a longitudinal vertical sectional view taken substantially on the line 3—3 of Figure 2;

Figure 4 is a transverse sectional view taken vertically through the body with the walls of the housing in a folded or compacted adjustment;

Figure 5 is a fragmentary longitudinal vertical sectional view taken substantially on the line 5—5 of Figure 4;

Figure 6 is a fragmentary detailed sectional view on an enlarged scale taken substantially on the line 6—6 of Figure 3;

Figure 7 is a fragmentary detailed sectional view taken substantially on the line 7—7 of Figure 6;

Figure 8 is a detailed sectional view illustrating in detail the interlocking meeting edges of adjacent roof panels;

Figure 9 is an enlarged fragmentary vertical sectional view taken at a rear upper corner portion of the housing;

Figure 10 is a detailed sectional view taken substantially on the line 10—10 of Figure 9;

Figure 11 is a fragmentary view in top plan of the structure as illustrated in Figures 9 and 10;

Figure 12 is a detailed sectional view taken substantially on the line 12—12 of Figure 2;

Figure 13 is a fragmentary view in outside elevation at the rear end of the housing illustrating in detail the mounting of the door sections;

Figure 14 is a fragmentary detailed sectional view illustrating the dowel connection at one end of the ridge bar;

Figure 15 is a fragmentary detailed sectional view taken substantially on the line 15—15 of Figure 2;

Figure 16 is a transverse vertical sectional view illustrating a vehicle body constructed in accordance with a further embodiment of my invention and with the parts in extended adjustment;

Figure 17 is a fragmentary transverse vertical sectional view taken through the invention as illustrated in Figure 16 but with the various parts in their lowered or compacted adjustment;

Figure 18 is a fragmentary longitudinal sectional view taken substantially on the line 18—18 of Figure 17;

Figure 19 is a fragmentary detailed sectional view taken substantially on the line 19—19 of Figure 16;

Figure 20 is a horizontal sectional view taken substantially on the line 20—20 of Figure 16;

Figure 21 is a detailed view partly in section and partly in elevation illustrating one of the pairs of coacting guide members as embodied in this second form of my invention;

Figure 22 is a fragmentary transverse sectional view illustrating a vehicle body constructed in accordance with a still further embodiment of my invention;

Figure 23 is a fragmentary detailed sectional view taken substantially on the line 23—23 of Figure 22;

Figure 24 is a fragmentary transverse sectional view showing certain of the parts as illustrated in Figure 22 in a second or lowered position.

In the embodiment of my invention as particularly illustrated in Figures 1 to 15 inclusive, B denotes a base or floor member which may be of any dimensions preferred and constructed in a manner which is believed to be to the best advantage. One end portion of the base or floor member B is provided with a suitable hitch $h$ which may be as preferred whereby the base or floor member may be suitably coupled to a motor, such as a pleasure automobile although, of course, if desired it could be hitched with equal facility to a tractor.

The base or floor member B at each side thereof and at a desired point intermediate its ends has associated therewith a ground engaging wheel W. As the mounting of the base or floor member B upon the ground engaging wheels forms no particular part of the present invention, a detailed description and illustration thereof is not thought necessary.

The under surface of the base or floor member B adjacent each end has hingedly connected therewith, as at 1, the transversely disposed props P. Each of these props P in its construction preferably includes a vertically adjustable leg 2 so that when the prop is lowered into supporting position as illustrated for example in Figure 1, the leg can be adjusted to compensate for any unevenness or inequalities which may be present in the surface upon which the device is to be placed.

The upper surface of the base or floor member B is substantially smooth and unobstructed and it is to be stated at this time that in its manufacture it is to be built of such strength as to permit it to be used when desired in the haulage of average loads.

However, the strength is also to be such as to withstand the ordinary weight, wear and tear when the same is used in connection with a housing H.

This housing H comprises the lower side wall sections S and the lower end sections E. Each of these sections S and E may be constructed as preferred, it only being necessary that they have the required strength but each of said sections at a point above its lower marginal edge is provided therealong with an inwardly disposed cleat or member 3 which is adapted to seat from above upon the associated marginal portion of the base or floor member B with the lower marginal portion of the wall lapping the adjacent edge face or portion of the base or floor member B.

A series of threaded shanks 4 are inserted from below up through the base or floor member B and through the cleat 3 and threading upon each of said shanks 4 above the cleat 3 is a wing nut 5 or the like whereby each of the walls S or E may be securely or detachably held in applied position upon the base or floor member B. This connection also allows with equal facility the removal of such walls as desired.

At this time it is to be stated relative to the ground engaging wheels W that it is preferred that each of such wheels be positioned directly beneath the base or floor member B and as it is also important to have such base or floor member as low as possible, the base or floor member is provided at each side thereof with an upstanding hood in each of which is adapted to be received from below the upper portion of a wheel. These hoods 6 are particularly illustrated in Figures 2 and 3.

It is also preferred that the walls S and E be separable so that when the housing H is knocked down the various walls can be stored away in a small space. Therefore, as herein disclosed, the butting ends of adjacent walls S and E are detachably held together by the stud bolts 7 on which are threaded conventional clamping nuts 8.

Each upper side wall S' comprises end posts 9 and a central post 10, each of which is hingedly connected, as at 11, with the upper marginal portion of a lower side wall S, such hinge connections 11 allowing said posts 9 and 10 to readily swing inwardly of the side wall and have close contact with the inside face thereof if desired in order that such posts will be substantially out of the way when the housing is compacted for transportation. Each of the posts 9 and 10 has extending outwardly from its upper end a dowel pin 12 which is received within a suitably positioned opening provided in the under surface of a top rail 14 which extends fore and aft with respect to the base or floor member B. It is to be understood that when the housing is to be collapsed for storage, the rail 14 can be readily removed but in ordinary use with the housing it is not necessary that there be such removal of the rail.

Each of the end or corner posts 9 at its outer end is provided with a second dowel pin 15. The dowel pins 15 of the front posts 9 engage from below within the end portions of a transverse or cross rail 16. The dowel pins 15 carried by the rear posts 9 engage from below within the outer end portions of the short rail sections 17, each of which is of a length to bridge the space between the rail 14 and a vertical stile 18 comprised in the upper section of a door frame structure D. Each of these rail sections 17 is detachably secured to a stile 18 through the instrumentality of a coacting stud bolt 19 carried by the stile 18 and bracket 20 carried by the rail section 17, said stud bolt having threaded thereon a conventional type of clamping nut 21. It is, therefore, believed to be self-evident that the rail section 17 can be readily removed when the housing is to be folded or compacted for transportation or when such housing H is to be collapsed or knocked down for storage.

The stiles 18 of the upper section of the door frame structure D are hingedly connected, as at 22, to the stiles 18' of the lower section of the door frame structure, said stiles 18' being comprised in the front end wall structure E. By this it is to be understood that the front end wall comprises two substantially duplicate sections which, when applied, provide a space between their inner or opposed ends equal to the desired width of the door opening. This hinge connection between the stiles 18 and 18' permits the upper section of the door structure to swing inwardly of the lower portion of the housing when said housing is being compacted for transportation.

As is particularly illustrated in Fig. 4 and 5, this upper section of the door when folded or swung inwardly assumes substantially a horizontal position. This is desirable as it requires that no particular restriction be placed as to the height of the door with respect to the other dimensions of the walls of the housing and, furthermore, allows the lower portion of the housing to be used for the purposes of storing goods and the like desired to be transported.

Corresponding stiles 18 and 18' each have hingedly connected thereto, as at 23, and preferably by two hinges, a door section 24. Disposed transversely across the upper end portion of the lower door section 24 is a plate 25 which, as is particularly illustrated in detailed Figure 12, extends beyond the adjacent upper edge of the lower door section 24 so that it will lap the associated applied upper door section. After the two door sections have been placed in proper assembly a bolt 26 is disposed, as illustrated in Figure 12, through the lower portion of the upper door section 24 and threaded within the blind nut 27 carried by the plate 25. This single bolt 26 in practice is sufficient to maintain the door sections in desired assembled working relation.

To assure the assembled door structure D and more particularly the upper section thereof being maintained in rigid position, I interpose between the crown 28 of the upper door section and the rear end portion of the applied ridge bar 29, a prop bar 30. The upper end of this prop bar 30 is provided with an outstanding dowel 31 which extends from below within the adjacent rear end portion of the ridge bar 29 while the lower portion of this prop bar 30 is held to the crown 28 of the upper door section by a plate 32 removably or detachably secured, as at 33, to both the bar 30 and the crown 28. By this detachable connection the bar 30 can, of course, be readily removed when the upper portion of the housing is to be compacted or the housing in its entirety is to be collapsed for storage.

This prop bar 30 is particularly intended for the maintenance of the door frame structure in effective applied position and only serves incidentally as a support for the ridge bar 29 as this ridge bar 29 is maintained in desired placement by the rafters 34 which extend inwardly and upwardly from the rails 14 on predetermined angles. The upper or opposed extremities of the rafters 34 are notched, as at 35, to best receive and engage the ridge bar 29 while the lower and outer end portions of these rafters 34 are also notched, as at 36, to have effective engagement with suitably formed holding cleats 37 secured along the upper faces of the rails 14. While in the present embodiment of my invention I show these cleats 37 as separate from the rails 14, it is believed to be obvious that if desired such parts may be integral.

The applied ridge bar 29 provides a support for the top part of a canopy C preferably of heavy canvas or kindred textile material. This canopy is so constructed as to extend down along and over the outer faces of the side walls of the extending or assembled housing. Each longitudinal marginal portion of the canopy C when applied laps a rail 14 and is buttoned thereto, as at 38. Each lapping marginal portion of the canopy C is continued to provide a curtain 39 to afford an effective medium for closing the upper side wall of the housing to prevent ingress of the elements or for other purposes as desired. Each of these curtains 39 may be raised or lowered in any manner preferred but this in itself is of no particular importance insofar as the present invention is concerned. However, as illustrated in the accompanying drawings, the lower marginal portion of each of the curtains 39 is adapted to be rolled upon a pole 40 or the like through the instrumentality of the suitably positioned pull rope 41. Each of the curtains 39 may also be effectively held in lowered position in any manner preferred but I find it of particular advantage to engage the bottom portion of a lowered curtain by a plurality of retractile members 42 suitably anchored to the adjacent side walls S and adapted to have detachable connection with a curtain 39.

The inner portions of the sections of the rear end wall E are preferably provided with upstanding stops 43 and positioned to be engaged from above by the rear corner posts 9 when the upper side wall sections are swung inwardly, it being also understood, as illustrated in the accompanying drawings, that when the housing is compacted for transportation these upper side wall sections assume the positions as particularly illustrated in Figures 4 and 5 of the drawings.

While at all times not necessary yet I find it of advantage to provide means, as particularly illustrated in Figures 6 and 7, for holding the upper and inner end portions of the rafters 34 in effective engagement with the ridge bar 29. As herein disclosed, this is accomplished by employing in connection with each pair of transversely alined rafters 34 a wedge-like strip 44 which engages the upper and inner portions of such rafters 34 from below and effectively clamps the same to the ridge bar 29 through the medium of the nuts 45 threading upon the bolts 46 which are carried by the bar 29 and extending through the wedge strip 44. It is not necessary that this strip or block 44 have a wedging action it only being necessary that the strip or block prevent the upper and inner end portions of the rafters 34 from dropping down away from the ridge bar 29.

Each of the rails 14 along its inner lower marginal portion is formed to provide a rabbet 47 which is adapted to freely receive the lower marginal portion of a ceiling panel 48. These panels 48 are substantially duplicate in construction and are of such dimensions as to provide a paneled ceiling for the extended housing from substantially one end thereof to the other. The outer faces of these panels 48 adjacent their side marginal portions are provided with means, such as illustrated at 49 in Figure 8, whereby said side marginal portions of adjacent panels will have interlocking engagement, thus facilitating the desired maintenance of the panels in applied or working position.

The upper marginal portions of the panels are provided theracross with depending lips or flanges 50, the flanges of the panels at one side of the ceiling butting the flanges 50 at the opposite side as is particularly illustrated in Figure 6 of the drawings. Disposed through these butting or contacting flanges or lips 50 at predetermined points therealong are the cotter pins 51 or the like which serve to maintain the desired assembly. While the conventional spreading of the extremities of the pins may be sufficient to prevent displacement of such cotter pins, particularly when the vehicle body is in transit with the extended housing in use, yet I find it of advantage to provide additional means such as a retractile spring 52, one end of which is operatively engaged with the eye of each cotter pin and extending below and across the butting or contacting lips or flanges 50 and secured to the opposite end portion of the cotter pin.

To further assure the various panels 48 being properly maintained in assembly, I tie or connect the adjacent panels 48 by the plates 53 which bridge the joint between adjacent longitudinally arranged panels, said plates being detachably and rigidly secured to the lips or flanges 50 through the medium of the coacting bolts 54 and nuts 55. The nuts 55 can be readily removed or applied so that the panels 48 can be placed in position or taken down with facility.

In applying or taking down the panels 48 it is to be understood that there must be sufficient play of the panels, as for example at the front end, to allow for the desired movement of such end panels to effect the engagement or disengagement of the joints 49.

While it forms no part of the present invention, the front end wall E carries a box T which may be used for holding tools, a motor, or any other accessories desired. The sections of the rear end wall E also each preferably carries the box T' to hold luggage or other articles as may be desired.

It is to be noted that when the canopy C is applied a space is provided between said canopy C and the applied ceiling panels 48. This is of importance and advantage as such space provides an effective heat insulation while, of course, the applied canvas also affords further means to protect the interior of the housing against the elements.

The spaces between the posts 9 and 10 are adapted to be closed by suitable screen structures 56 which are preferably secured to the outer faces of the rails 14. I do not, however, wish to be understood as limiting myself to the use of these screen elements 56 as, of course, if preferred, solid panels may be used or such spaces otherwise closed.

In the embodiment of my invention as illustrated in Figures 16 to 21 inclusive, the construction of the side and end walls of the housing is substantially the same as hereinbefore described with respect to the first embodiment of my invention, but it is to be noted that the use of the canopy is omitted. The end walls of the upper section, however, are provided with the removable canvas panels 57. The roof R of the housing as herein disclosed, constitutes a single unit and may be constructed as desired. This roof section R is adapted to be raised or lowered and for which reason the central portion of the roof section R has engaged therewith, as at 58, a conventional type of lifting jack 59 which is positioned at substantially the axial center of the base or floor member B'. This jack 59 may be operated in any manner preferred but, as particularly illustrated in Figure 18, it is operated by a crank 60 which extends beyond the rear end wall of the housing. The roof R has depending from its marginal portions the flanges 61 which, when the upper side wall sections have been folded inwardly with respect to the lower portion of the housing, rests upon the upper edges of the side and end walls of the lower section of the housing and thus effectively enclose all articles which may previously have been placed upon the base or floor member B' within the lower portion of the housing. When it is desired to extend the wall structure to assemble the housing for occupancy, it is only required that the jack 59 be so operated to raise the roof structure R to a desired height whereupon the end and side walls of the upper section of the housing are swung into position and then the roof R lowered to have contact with the upper edge faces of said end and side walls of the upper section of the housing. After this is done the flanges 61 of the roof section may be hooked, as at 62, or otherwise secured to the side and end walls of the upper section of the housing. It is to be noted that the flanges 61 are so constructed as to lap the upper marginal portions of the lower wall sections when the roof has been brought down so as to protect the interior of the compacted housing against the elements.

When the roof section R is in its raised position, this formation of the flanges 61 as illustrated at 63 provides a mounting for the screen or panel elements 64, as illustrated in Figure 16.

It is of importance that means be provided not only to guide but to reinforce the roof section R as it moves up and down. As herein disclosed, the side flanges 61 at the opposite end portions thereof have secured thereto the upper end portion of a guide rod 65 which telescopically engages from above an upstanding tubular member 66 rigidly secured, as at 67, to the lower portion of the housing structure.

In the embodiment of the invention as illustrated in Figures 16 to 21, the upper end walls include canvas panels but in the embodiment of the invention as illustrated in Figures 22 to 24 each of the end walls E'' comprises a structure which extends substantially entirely across the housing and is hingedly connected, as at 68, to swing inwardly as a unit. In other words, in this embodiment of my invention each end wall constitutes a substantially solid structure.

I claim:

1. A vehicle body comprising a floor structure, a housing of a knock-down type, means for securing the housing in applied position upon the floor structure, a roof structure, a jack interposed between the central portions of the floor structure and the roof structure for raising said roof structure as a unit, said roof structure when in one position closing the top of the housing when in assembly for occupancy, elongated guide rods secured to the roof structure and extending downwardly therefrom and free of connection with the housing, upstanding elongated members secured to the lower portion of the housing and free of connection with the roof structure, said rods and members being slidably engaged one with the other and coacting to provide both a guiding means and reinforcement for the roof structure, said sliding engagement between the rods and members being telescopic, said rods and members being positioned exteriorly of the housing when assembled for occupancy to offer no obstruction to the housing when knocked down or extended.

2. A vehicle body comprising a floor structure, a housing of a knock-down type, means for securing the housing in applied position upon the floor structure, a roof structure, means for raising said roof structure as a unit, said roof structure when in one position closing the top of the housing when in assembly for occupancy, elongated guide rods secured to the roof structure and extending downwardly therefrom and free of connection with the housing, upstanding elongated members secured to the lower portion of the housing and free of connection with the roof structure, said rods and members being slidably engaged one with the other and coacting to provide both a guiding means and reinforcement for the roof structure, said sliding engagement between the rods and members being telescopic, said rods and members being positioned exteriorly of the housing when assembled for occupancy to offer no obstruction to the housing when knocked down or extended.

3. A vehicle body comprising a floor structure, a housing of a knock-down type, means for securing the housing in applied position upon the floor structure, a roof structure, said roof structure being movable to a position to close the top of the housing when in assembly for occupancy, elongated guide rods secured to the roof structure and extending downwardly therefrom and free of connection with the housing, upstanding elongated members secured to the lower portion of the housing and free of connection with the roof structure, said rods and members being slidably engaged one with the other and coacting to provide both a guiding means and reinforcement for the roof structure, said sliding engagement between the rods and members being telescopic, said rods and members being positioned exteriorly of the housing when assembled for occupancy to offer no obstruction to the housing when knocked down or extended.

RUBY R. ROLOSON.